United States Patent
Fritz et al.

(10) Patent No.: US 12,216,523 B2
(45) Date of Patent: *Feb. 4, 2025

(54) SYSTEM AND METHOD FOR ERROR DETECTION AND MONITORING OF OBJECT-ASSET PAIRS

(71) Applicant: Bytedance Inc., Wilmington, DE (US)

(72) Inventors: Kyle Fritz, Baltimore, MD (US); Paul Barry, Baltimore, MD (US); Jamie Gaskins, Baltimore, MD (US)

(73) Assignee: Bytedance Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/113,380

(22) Filed: Feb. 23, 2023

(65) Prior Publication Data

US 2023/0350740 A1    Nov. 2, 2023

Related U.S. Application Data

(63) Continuation of application No. 17/239,090, filed on Apr. 23, 2021, now Pat. No. 11,614,984, which is a
(Continued)

(51) Int. Cl.
*G06F 11/07* (2006.01)
*H04L 43/0823* (2022.01)
*H04L 43/0888* (2022.01)

(52) U.S. Cl.
CPC ...... *G06F 11/0709* (2013.01); *G06F 11/0769* (2013.01); *G06F 11/0793* (2013.01); *H04L 43/0823* (2013.01); *H04L 43/0888* (2013.01)

(58) Field of Classification Search
CPC ............. G06F 11/0709; G06F 11/0769; G06F 11/0793; H04L 43/0823; H04L 43/0888
(Continued)

(56) References Cited

U.S. PATENT DOCUMENTS 5,999,565 A   12/1999  Locklear et al.
8,417,828 B2   4/2013  Ma et al.
(Continued)

OTHER PUBLICATIONS

Wikipedia "request response" page, retrieved from https://en.wikipedia.org/wiki/Request%E2%80%93response (Year: 2021).
(Continued)

*Primary Examiner* — Yair Leibovich
(74) *Attorney, Agent, or Firm* — Alston & Bird LLP

(57) ABSTRACT

An apparatus, method, and computer program product are provided to detect error conditions and otherwise monitor the status of request data object and network response assets and related systems to allow for the efficient movement of network resources and other resources in high-volume network environments. In some example implementations, otherwise unrelated request data objects and their related parameters, along with otherwise unrelated network response asset systems are depicted on a single interface such that pairings between request data objects and network response assets, and other status information can be readily viewed. Some example implementations contemplate the use of location data in connection with error detection and remediation. Some example implementations also contemplate the establishment and use of a communication channel between an interface system and a system associated with a request data object and/or a network response asset upon the detection of an error condition.

20 Claims, 4 Drawing Sheets

Related U.S. Application Data continuation of application No. 16/295,506, filed on Mar. 7, 2019, now Pat. No. 11,030,026, which is a continuation of application No. 15/280,237, filed on Sep. 29, 2016, now Pat. No. 10,268,533.

(60) Provisional application No. 62/235,544, filed on Sep. 30, 2015.

(58) Field of Classification Search
USPC .......................................................... 714/57
See application file for complete search history.

(56) References Cited

U.S. PATENT DOCUMENTS

| | | | |
|---|---|---|---|
| 9,021,934 B1 | 5/2015 | Hagerty | |
| 9,680,554 B2 | 6/2017 | Moshfeghi | |
| 10,268,533 B1* | 4/2019 | Fritz | G06F 11/0769 |
| 2008/0043256 A1* | 2/2008 | Broda | G06Q 10/06 |
| | | | 358/1.3 |
| 2011/0191414 A1 | 8/2011 | Ma et al. | |
| 2011/0191432 A1* | 8/2011 | Layson, Jr. | H04M 3/42382 |
| | | | 709/206 |
| 2012/0170412 A1 | 7/2012 | Calhoun et al. | |
| 2013/0147913 A1* | 6/2013 | Steiner | H04N 21/4788 |
| | | | 348/43 |
| 2014/0233430 A1 | 8/2014 | Russell | |
| 2016/0100377 A1 | 4/2016 | Bryant et al. | |

OTHER PUBLICATIONS

Wikipedia definition of "data stream", retrieved from https://en.wikipedia.org/wiki/Data_stream. (Year: 2018).
U.S. Appl. No. 17/239,090, filed Apr. 23, 2021.
U.S. Appl. No. 16/295,506, filed Mar. 7, 2019.
U.S. Appl. No. 15/280,237, filed Sep. 29, 2016.

* cited by examiner

SYSTEM AND METHOD FOR ERROR DETECTION AND MONITORING OF OBJECT-ASSET PAIRS

CROSS-REFERENCE TO RELATED APPLICATIONS

This application is a continuation of U.S. patent application Ser. No. 17/239,090, filed Apr. 23, 2021, which is a continuation of U.S. patent application Ser. No. 16/295,506, filed Mar. 7, 2019, and issued as U.S. Pat. No. 11,030,026 on Jun. 8, 2021, which is a continuation of U.S. patent application Ser. No. 15/280,237, filed Sep. 29, 2016, and issued as U.S. Pat. No. 10,268,533 on Apr. 23, 2019, which claims the benefit of U.S. Provisional Patent Application No. 62/235,544, which was filed on Sep. 30, 2015, the entire contents of each of which are incorporated by reference herein for all purposes.

TECHNICAL FIELD

An example embodiment relates generally to devices, systems, and interfaces that provide for error detection and monitoring in high-volume network environments that involve the pairing of request data objects to systems associated with a distributed set of network response assets. Example implementations are directed to the detection of error conditions associated with request data objects and network response assets, including but not limited to the detection of locations of network response asset systems that are indicative of or otherwise correlated to error conditions.

BACKGROUND

As many individuals, industries, networks, and other operations have come to rely and depend the use of mobile devices to request and access resource-intensive and highly complex systems, many of the systems that receive such access requests have turned to the use network response assets that are associated with numerous distributed systems that are each capable of handling small subsets of request data objects and fulfilling the requests contained therein. While the use of such distributed architectures can be efficient, at least in the sense that it alleviates the need for a single system to receive, handle, and fulfill all related request data objects and the requests contained therein, the use of distributed and potentially non-uniform systems creates a number of technical challenges associated with monitoring the performance of such systems and detecting error conditions associated therewith. These technical challenges are compounded as the volume of request data objects increases and as the number of network resource access systems increases to accommodate such an increase in request data object volume.

Attempts to monitor and detect error conditions in very large systems featuring high volumes of request data objects and many network response asset systems are significantly impeded by the large number of datastreams and the large quantity of related data that must be monitored and processed. Presenting a monitoring system and/or operators associated with such a monitoring system with such large numbers of independent data streams and large volumes of data requires numerous operational and organizational challenges to be overcome in order to efficiently detect and address error conditions that arise is such systems.

BRIEF SUMMARY

An apparatus, computer program product, and method are therefore provided in accordance with an example embodiment in order to monitor, detect errors, and remediate errors associated with request data objects and the network response assets (and/or systems related to such network response assets) used to meet the requirements associated with each request data object. In this regard, the method, apparatus and computer program product of an example embodiment provide for extracting request parameters and network response asset data from separate pluralities of datastreams and generating sets of renderable objects that can be presented on a single user interface as a collection of selectable objects thereon. Moreover, the method, apparatus, and computer program product of an example embodiment provide for the detection of error conditions associated with request data object and/or network response assets, causing indicia of such error conditions to be presented via the user interface, and, upon a selection of such indicia, the opening of a communication channel with systems associated with the request data object and/or network response asset experiencing the error condition.

In an example embodiment, an apparatus is provided, the apparatus comprising a processor and a memory, the memory comprising instructions that configure the apparatus to: receive a plurality of first data streams, wherein each first data stream within the plurality of first data streams is associated with a request data object; receive a plurality of second data streams, wherein each second data stream within the plurality of second data streams is associated with a network response asset; extract from each first data stream a set of request parameters, wherein the set of request parameters comprises: a first location identification, wherein the first location identification is associated with a requested intermediate destination, a set of request instructions associated with the requested intermediate destination, and a second location identification, wherein the second location identification is associated with a requested target destination; extract from each second data stream a set of network response asset data, wherein the set of network response asset data comprises: a third location identification, wherein the third location identification information comprises a triangulation location of a mobile device associated with the network response asset; generate a first set of renderable object data, wherein the first set of renderable object data is associated the set of request parameters; generate a second set of renderable object data, wherein the second set of renderable object data is associated with the network response asset data; and generate a control signal causing the first set of renderable object data and the second set of renderable object data to be displayed on a single user interface as a set of selectable objects.

In some example implementations of such an apparatus, the memory further comprises instructions that configure the apparatus to: detect an error condition associated with a request data object; and cause an indication of the error condition to be displayed on the single user interface. In some such example implementations, and in other example implementations, the set of selectable objects further comprises the indication of the error condition associated with the request data object. In some such example implementations, and in other example implementations, the memory further comprises instructions that configure the apparatus to: receive an indication of a selection of the selectable object associated with the error condition; and cause a communication channel to be opened with a system associated with the request data object.

In some example implementations of such an apparatus, the memory further comprises instructions that configure the apparatus to: detect an error condition associated with a network response asset; and cause an indication of the error condition to be displayed on the single user interface. In some such example implementations, and in other example implementations, the set of selectable objects further comprises the indication of the error condition associated with the response agent. In some such example implementations, and in other example implementations, the memory further comprises instructions that configure the apparatus to: receive an indication of a selection of the selectable object associated with the error condition; and cause a communication channel to be opened with a user device associated with the network response asset.

In another embodiment, a computer program product is provided, the computer program product comprising at least one non-transitory computer-readable storage medium having computer-executable program code instruction stored therein, the computer-executable program code instructions comprising program code instructions configured to: receive a plurality of first data streams, wherein each first data stream within the plurality of first data streams is associated with a request data object; receive a plurality of second data streams, wherein each second data stream within the plurality of second data streams is associated with a network response asset; extract from each first data stream a set of request parameters, wherein the set of request parameters comprises: a first location identification, wherein the first location identification is associated with a requested intermediate destination, a set of request instructions associated with the requested intermediate destination, and a second location identification, wherein the second location identification is associated with a requested target destination; extract from each second data stream a set of network response asset data, wherein the set of network response asset data comprises: a third location identification, wherein the third location identification information comprises a triangulation location of a mobile device associated with the network response asset; generate a first set of renderable object data, wherein the first set of renderable object data is associated the set of request parameters; generate a second set of renderable object data, wherein the second set of renderable object data is associated with the network response asset data; and generate a control signal causing the first set of renderable object data and the second set of renderable object data to be displayed on a single user interface as a set of selectable objects.

In some example implementations of such a computer program product the computer-executable program code instructions further comprise program code instructions configured to: detect an error condition associated with a request data object; and cause an indication of the error condition to be displayed on the single user interface. In some such example implementations and in other example implementations, the set of selectable objects further comprises the indication of the error condition associated with the request data object. In some such example implementations and in other example implementations, the computer-executable program code instructions further comprise program code instructions configured to: receive an indication of a selection of the selectable object associated with the error condition; and cause a communication channel to be opened with a system associated with the request data object.

In some example implementations of a computer program product, the computer-executable program code instructions further comprise program code instructions configured to: detect an error condition associated with a network response asset; and cause an indication of the error condition to be displayed on the single user interface. In some such example implementations and in other example implementations, the set of selectable objects further comprises the indication of the error condition associated with the response agent. In some such example implementations and in other example implementations, the computer-executable program code instructions further comprise program code instructions configured to: receive an indication of a selection of the selectable object associated with the error condition; and cause a communication channel to be opened with a user device associated with the network response asset.

In another embodiment, a method is provided, the method comprising: receiving a plurality of first data streams, wherein each first data stream within the plurality of first data streams is associated with a request data object; receiving a plurality of second data streams, wherein each second data stream within the plurality of second data streams is associated with a network response asset; extracting from each first data stream a set of request parameters, wherein the set of request parameters comprises: a first location identification, wherein the first location identification is associated with a requested intermediate destination, a set of request instructions associated with the requested intermediate destination, and a second location identification, wherein the second location identification is associated with a requested target destination; extracting from each second data stream a set of network response asset data, wherein the set of network response asset data comprises: a third location identification, wherein the third location identification information comprises a triangulation location of a mobile device associated with the network response asset; generating a first set of renderable object data, wherein the first set of renderable object data is associated the set of request parameters; generating a second set of renderable object data, wherein the second set of renderable object data is associated with the network response asset data; and generating a control signal causing the first set of renderable object data and the second set of renderable object data to be displayed on a single user interface as a set of selectable objects.

In some example implementations, the method further comprises: detecting an error condition associated with a request data object; and causing an indication of the error condition to be displayed on the single user interface. In some such example implementations and in other example implementations, the set of selectable objects further comprises the indication of the error condition associated with the request data object.

In some example implementations of such a method, the method further comprises: receiving an indication of a selection of the selectable object associated with the error condition; and causing a communication channel to be opened with a system associated with the request data object. In some such example implementations and in other example implementations the method further comprises: detecting an error condition associated with a network response asset; and causing an indication of the error condition to be displayed on the single user interface as a selectable object. In some such example implementations and in other example implementations, the method further comprises: receiving an indication of a selection of the selectable object associated with the error condition; and causing a communication channel to be opened with a user device associated with the network response asset.

BRIEF DESCRIPTION OF THE DRAWINGS

Figure 1:
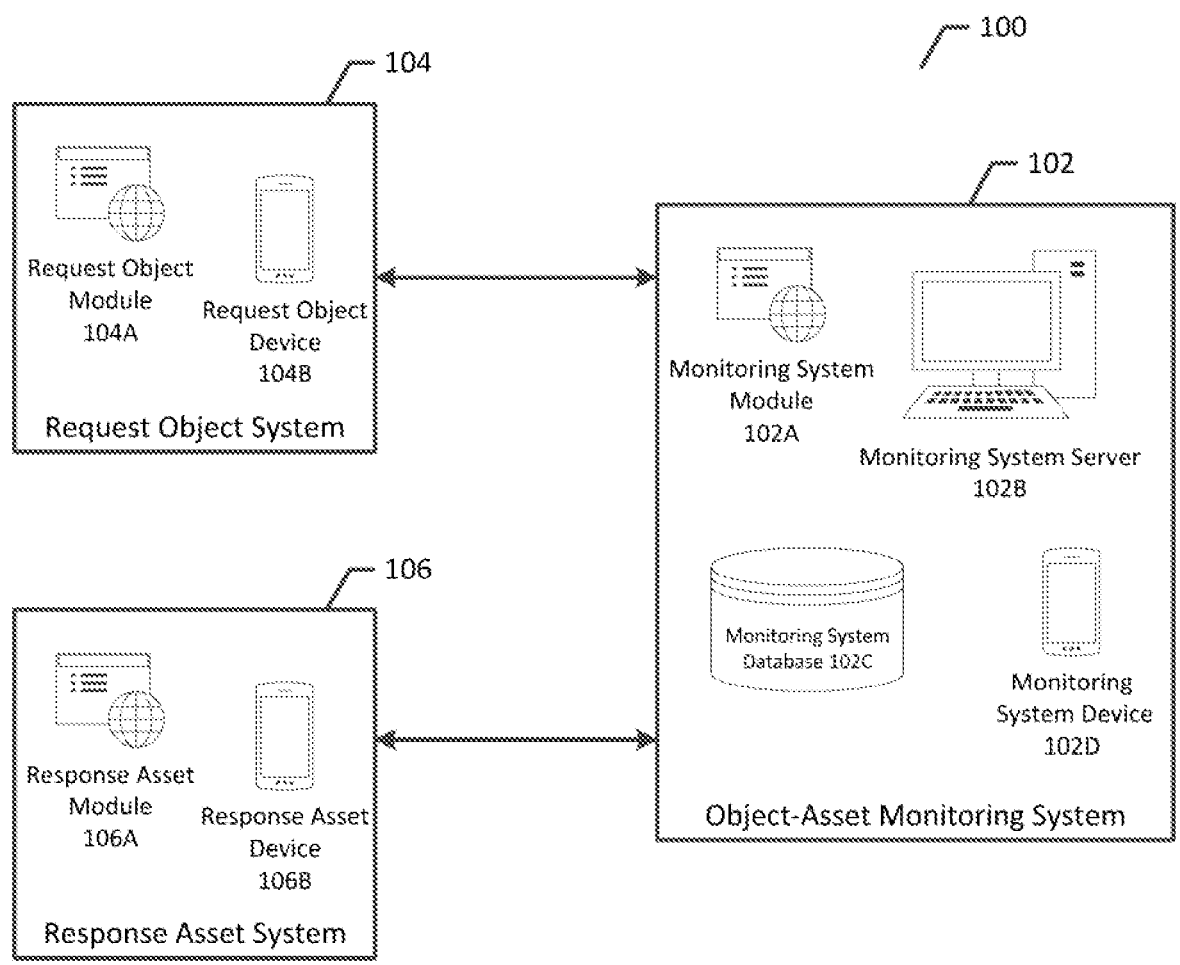
Figure 2:
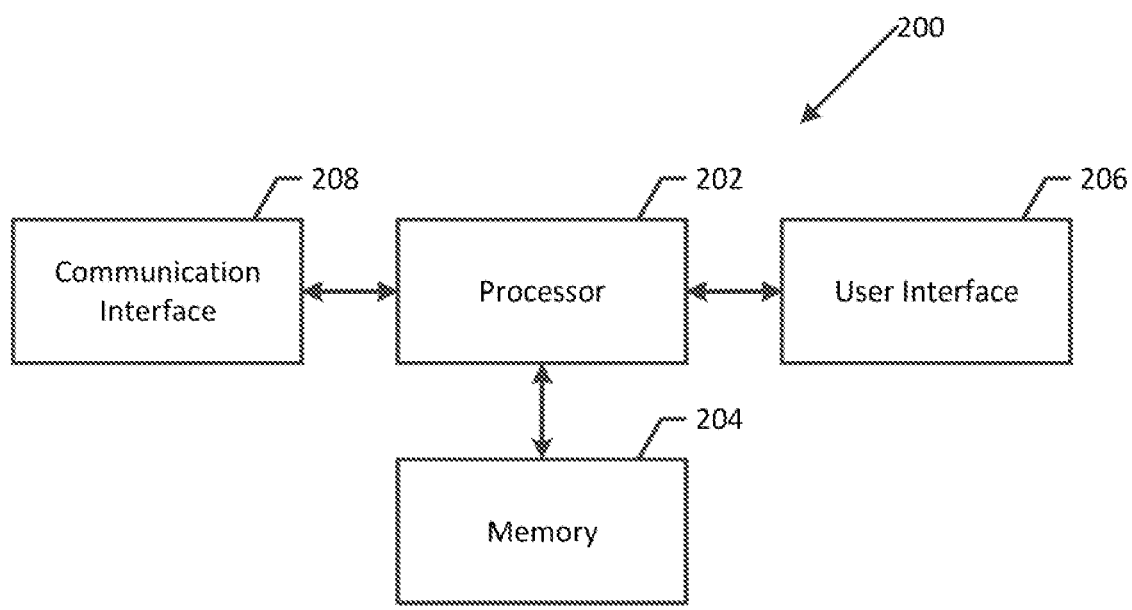
Figure 3:
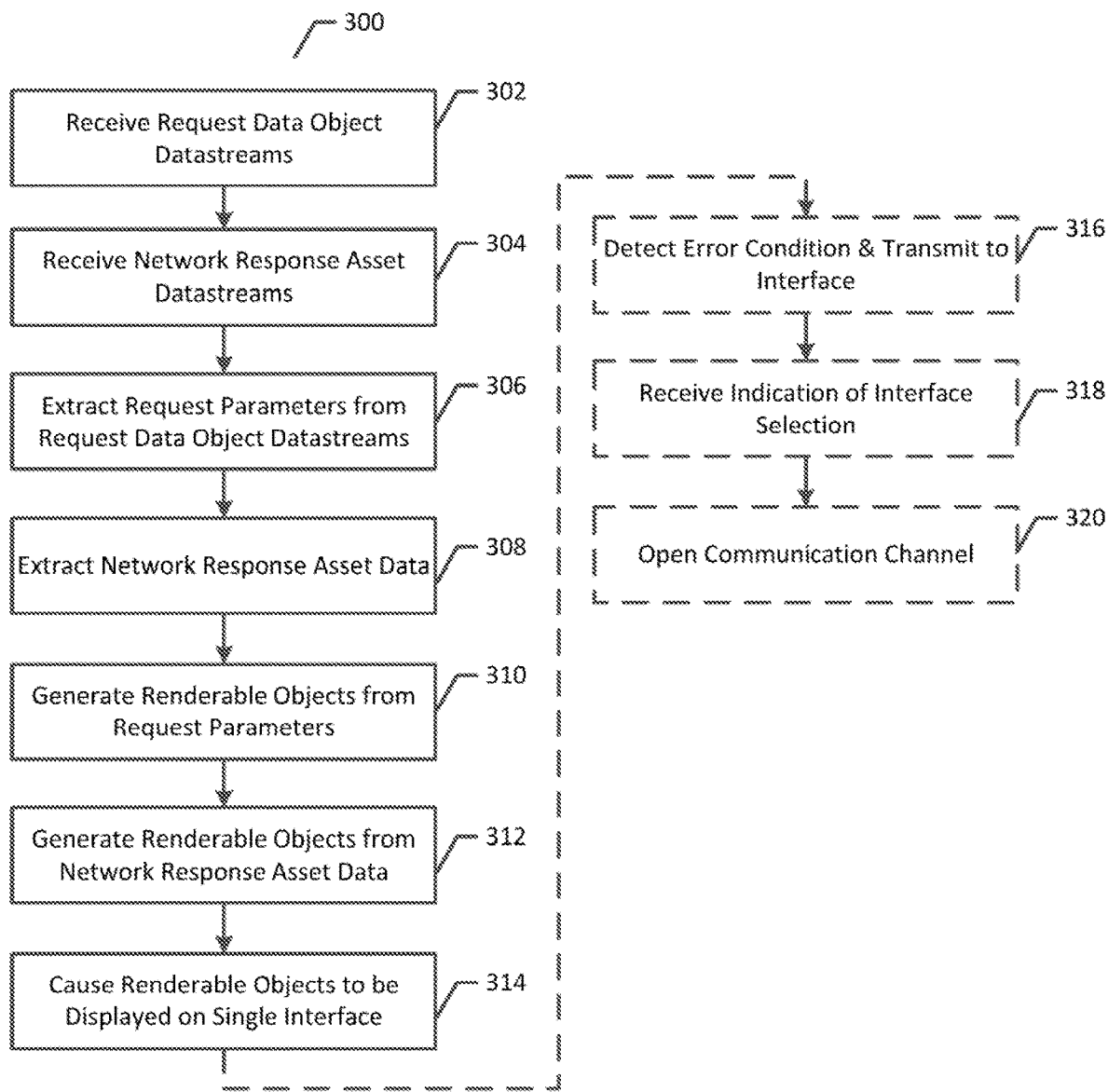
Figure 4:
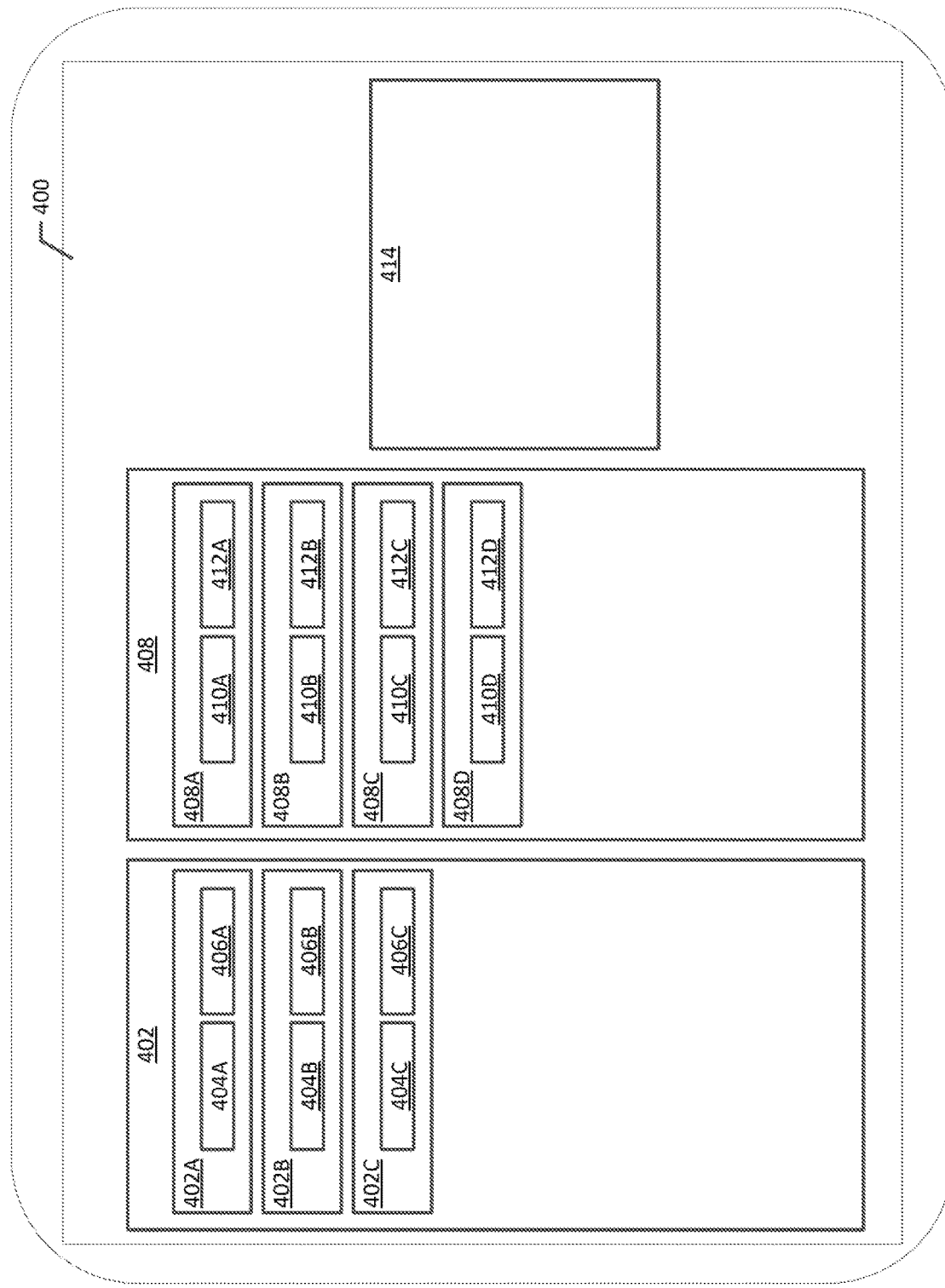

Having thus described certain example embodiments of the present disclosure in general terms, reference will here- inafter be made to the accompanying drawings, which are not necessarily drawn to scale, and wherein:

FIG. 1 depicts an example system environment in which implementations in accordance with an example embodiment of the present invention may be performed;

FIG. 2 is a block diagram of an apparatus that may be specifically configured in accordance with an example embodiment of the present invention;

FIG. 3 is a flowchart illustrating a set of operations performed, such as by the apparatus of FIG. 2, in accordance with an example embodiment of the present invention; and FIG. 4 is a simplified diagram of a display of a user interface that may be generated and used in accordance with an example embodiment of the present invention.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

As used herein, a "request data object" or "request object" is any data object that contains a request from a user or other entity for access to and/or use of system resources and an indication of the requirements and/or other parameters associated with the request.

As used herein, a "network response asset" is a finite network asset that may be paired with a request data object and is capable of providing network or other system resources in response to the request data object, and/or causing, through the interaction with other systems, the deployment of network and/or other system resources to fulfill the requirements and other parameters of a request data object.

As discussed in more detail below, many example implementations of embodiments of the present invention are particularly advantageous in contexts and situations that involve the requests for the physical movement and/or delivery of goods, materials, and/or other resources from one location to another within limited time parameters. In particular, several particularly advantageous implementations arise in contexts involving the delivery of food items from an intermediate destination, such as a restaurant, to a target destination, such as a home, business, and/or other location selected by a customer. In many such situations, request data objects that are associated with requests for the physical movement and/or delivery of goods, materials, and/or other resources are paired with network response assets and systems related to such network response assets, such as delivery vehicles, for example. In some such situations request data objects and network response assets (and their related systems) are associated with datastream which can be accessed by a monitoring interface, as contemplated and described herein. However, in systems that involve large numbers of datastreams and high volumes of data, effectively monitoring the datastreams, detecting error conditions and/or possible error conditions, and taking remedial action can be difficult.

For example, providing a monitoring system with a plurality of datastreams for request data objects and network response assets at one time presents organizational and operational challenges, especially when the underlying request data objects and/or network response assets are associated separate geographic regions. For example, a centralized server or database may collect all the data available in regard to the plurality of request data objects and network response asset systems, keeping the data updated in real-time or near real-time. Pushing all the available data to user interfaces (as an order dispatch dashboard, for example) may also cause operational issues. For example, pushing a large amount of data to an interface may cause updates to back up, for example, causing a browser application screen to lock up. Embodiments of the present invention provide various methods to ensure the browser application screen can display the data appropriately, such as by using rate limiting and batching of certain data to be pushed at a regular interval.

In some situations, an operator of a monitoring systems may only be able to review a portion of the data available or only find a portion of the data useful in monitoring and managing a set of request data objects and network response asset systems. In some example implementations of embodiments of the invention disclosed herein, the interface may take the form of a dispatch dashboard that may provide an operator with a view of every request data object or a view of every network response asset system on a map, for example. In some embodiments, the data may be rolled up or filtered such that an operator is only presented with actionable data, such as request data objects associated with unfulfilled requests, active network response asset systems, and/or request data objects and/or network response asset systems that may be in an error condition.

Some example implementations also provide for the prioritizing of request data objects and/or network response assets according to one or more parameters. For example, priority may be based on a time order, and/or a set of predetermined rules. For example, several types of problems and/or parameters may be defined, such that the detection and display of request data object information and/or network response asset information may be prioritized based on the parameter or type of problem.

In some embodiments, numerous sets of data may be provided to the system for processing and eventual display via a plurality of data streams. For example, each request data object and/or each network response asset system may be associated with a datastream. In some example implementations that involve the movement of goods, materials, and/or other resources from location to location for example, additional datastreams, such as traffic datastreams may also be provided that including data regarding distances and/or drive times between locations. Such traffic data streams, and other data streams, may be used in determining approaches to remediating error conditions.

In some example implementations, data may be provided and/or received according to different update schemes. For example, some data may be batched at a first rate and the batch update provided to the dispatch dashboard interface at a second rate. For example, driver positioning data (e.g., GPS positioning) for a network response asset system may be received every 10 seconds comprising batched second-by-second position data, and the driver location may then be updated in the dispatch dashboard once per minute. Other data may be pushed to the dispatch dashboard immediately as it is updated, for example, data regarding availability of network response asset systems or changes to request data object or statuses thereof.

Some example implementations provide for any data needing high precision to be pushed to an interface and/or otherwise processed immediately and for other data to be patched and pushed to an interface on a scheduled basis, for example, once per minute, allowing for reduced refresh of the interfaces.

Some example implementations may provide for managing the throughput of data to an interface by batching some data in the datastreams and pushing the batched data to the monitoring system on a regular interval rather than immediately as it is updated. For example, data such as driver location data and feedback data associated with a network response asset system may not need to be updated immediately on an interface display as changes occur. In such cases, data, such as location data, may be collected, for example by a central server or database, on a continuous basis or at relatively small intervals, such as collecting driver location data approximately once per second or so. This collected driver location data may then be batched, such as by the central server or database, and pushed out to the dispatch dashboard or driver chat interface on a less frequent basis, for example once every 10 seconds, once per minute, etc.

In some example implementations, data may also be provided to a central server or database in batched updates to manage system throughput. For example, some embodiments may provide for data from network response asset systems to be batched before being sent to the server or database, such as collecting the once per second driver location data and batching it to send to the server or database once every 10 seconds. In some example implementations, the system may, for example, analyze the bandwidth of a machine providing data to the interface and/or other component of the system. In accordance with the analyzed bandwidth, and/or a trained algorithm that is configured to analyze throughput/bandwidth in real time or near real time and generate a batching scheme, the batching algorithms may be adjusted. For example, in some cases, the system may batch more sets of data so as to conserve available bandwidth. In particular, the system may optimize bandwidth by adjusting the reporting of driver location to conserve bandwidth but still conserve situational awareness.

In some examples, an algorithm may include analyzing a total bandwidth available for incoming data streams and/or other information, analyzing the total number of active sources of information, determining the maximum batch time period that allows for accurate reporting, and adjusting the batch process such that information associated with request data object and/or network response asset systems are sent at a time period less than the maximum batch time.

Turning now to the Figures, FIG. 1 shows an example system environment 100 in which implementations involving the efficient monitoring of request data objects and the network response assets (and/or systems related to such network response assets) used to meet the requirements associated with each request data object, including but not limited to the detection and remediation of error conditions associated with such request data objects and network response asset systems. The depiction of environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1, and the environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

Embodiments implemented in a system environment such as system environment 100 advantageously provide for the generation of control signals that cause renderable objects associated with request data object parameters and network response asset system information to be displayed simultaneously on a single interface in a manner that includes a plurality of selectable objects with which a user may interact. In some instances, such embodiments further provide of the detection of error conditions and the opening of communication channels with systems associated the request data objects and/or network response asset systems that may be experiencing an error condition. Some such embodiments leverage a hardware and software arrangement or environment for request data object-to-network response asset pairing in accordance with the present invention.

As shown in FIG. 1, an object-asset monitoring system 102 includes an online object-asset monitoring system module 102A which is configured to receive, process, transform, transmit, communicate with and evaluate request data objects, content and other information associated therewith, and related interfaces via a web server, such as object-asset monitoring system server 102B and/or object-asset monitoring system device 102D. The object-asset monitoring system server 102B is connected to any of a number of public and/or private networks, including but not limited to the Internet, the public telephone network, and/or networks associated with particular communication systems or protocols, and may include at least one memory for storing at least application and communication programs.

It will be appreciated that all of the components shown FIG. 1 may be configured to communicate over any wired or wireless communication network including a wired or wireless local area network (LAN), personal area network (PAN), metropolitan area network (MAN), wide area network (WAN), or the like, as well as interface with any attendant hardware, software and/or firmware required to implement said networks (e.g. network routers and network switches). For example, networks such as a cellular telephone, an 802.11, 802.16, 802.20 and/or WiMax network, as well as a public network, such as the Internet, a private network, such as an intranet, or combinations thereof, and any networking protocols now available or later developed including, but not limited to TCP/IP based networking protocols may be used in connection with system environment 100 and embodiments of the invention that may be implemented therein or participate therein.

As shown in FIG. 1, object-asset monitoring system 102 also includes an object object-asset monitoring database 102C that may be used to store information associated with request data objects, interfaces associated with such request data objects, and/or systems associated therewith, response asset systems and/or information provided thereby or associated therewith, and/or other information related to the monitoring and/or communication with request data objects, network response asset systems, and/or associated interfaces, which can be accessed by the object-asset monitoring system module 102A, the object-asset monitoring system server 102B, and/or the object-asset monitoring system device 102D. While FIG. 1 depicts object-asset monitoring system database 102C as a single structure, it will be appreciated that object-asset monitoring system database 102C may additionally or alternatively be implemented to allow for storage in a distributed fashion and/or at facilities that are physically remote from the each other and/or the other components of object-asset monitoring system 102. Object-asset monitoring system 102 is also shown as including object-asset monitoring system device 102D which may take the form of a laptop computer, desktop computer, or mobile device, for example, to provide an additional means (other than via a user interface of the object-asset monitoring system server 102B) to interface with the other components of object-asset monitoring system 102 and/or other components shown in or otherwise contemplated by system environment 100.

Request data objects and/or additional information to be associated with one or more request data objects may originate from a client system such as request object system 104. A user of request object system 104 may use a request object device 104B, such as a laptop computer, desktop computer, or mobile device, for example, to interface with a request object module 104A to generate a request data object and/or information to be included in a request data object, such as instructions associated with the request data object, intermediate and/or target destinations associated with the request object, and/or other information to be conveyed from a user as part of a request for a response to be conveyed to an object-asset monitoring system, such as object-asset monitoring system 102. In some example implementations, such as those that arise in contexts and situations where users seek to have goods, materials, and/or other resources delivered from one location to another, a request object system such as request object system 104 may take the form of, or be incorporated into, a user's mobile device which is configured to accept request information, such as an order for food from a restaurant, and transmit that information in the form of a request data object to an object-asset monitoring system.

While only one request object system 104 is depicted in FIG. 1 in the interest of clarity, it will be appreciated that numerous other such systems may be present in system environment 100, permitting numerous users to develop and transmit, either directly or indirectly through other systems, request data objects to the object-asset monitoring system 102

As shown in FIG. 1, system environment 100 also includes response asset system 106, which comprises a response asset module 106A and a response asset device 106B. While only one response asset system 106 is depicted in FIG. 1 in the interest of clarity, it will be appreciated that numerous additional such systems may be present in system environment 100, permitting numerous, distributed network response assets to be paired with request data objects and fulfill the requests contained therein. Response asset device may comprise and/or incorporate a laptop computer, desktop computer, mobile device, or the like, for example, and is configured to interface with a response asset module 106A to interact with object-asset monitoring system 102 to receive and operate on tasks associated with the fulfillment of the request(s) associated with one or more request data objects that have been paired with the network response asset. The response asset system 106 is also capable of communicating with object-asset monitoring system 102 to provide information that the object-asset monitoring system 102 may need when determining the status of the response asset system, such as a location of the response asset system, and whether the response asset system has completed any of the tasks assigned to the response asset system 106. For example, response asset system 106 may, such as via the capabilities of response asset device 106B ascertain the location of response asset system 106 through the use of a global positioning system (GPS) interface, cellular location protocols, and/or other location protocols that involve triangulating and/or otherwise determining a position of response asset device 106B and/or other components associated with response asset system 106. In some example implementations, such as those that arise in contexts or situations involving the delivery of goods, materials, and/or other resources, for example, the response asset system may include and/or be incorporated into a vehicle.

Overall, and as depicted in system environment 100, object-asset monitoring system 102 engages in machine-to-machine communication with request data object system 104 and network response asset system 106, via one or more networks, to facilitate the processing of request data object information received from request data object system 104 and response asset system 106, to provide for the efficient monitoring and error detection described and otherwise contemplated herein.

Based upon the parameters associated with a request data object and input for systems associated with a corresponding network response asset, renderable objects associated therewith are generated and presented on a display of a user device as selectable objects. In some example situations, error conditions associated with a request data object and/or network response asset system may be detected, and communication channels with related systems may be opened in response. In this regard, a request data object may and input data from a systems associated with a network response asset may be processed and operated on by an apparatus 200 as depicted in FIG. 2. The apparatus may be embodied by the object-asset monitoring system 102, or any of the components shown or otherwise contemplated therein, any of the other devices discussed with respect to FIG. 1, and/or any other devices that may be incorporated or otherwise associated with environment 100. Alternatively, the apparatus 200 may be embodied by another computing device, external to such devices. For example, the apparatus may be embodied by a personal computer, a computer workstation, a server or the like, or by any of various mobile computing devices, such as a mobile terminal, e.g., a smartphone, a tablet computer, etc.

Regardless of the manner in which the apparatus 200 is embodied, the apparatus of an example embodiment is configured to include or otherwise be in communication with a processor 202 and a memory device 204 and optionally the user interface 206 and/or a communication interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/ or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include a user interface 206 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 204, and/or the like).

The apparatus 200 may optionally also include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

FIG. 3 is a block diagram illustrating a set of operations 300 performed, such as by the apparatus of FIG. 2, in accordance with an example embodiment of the present invention. It will be appreciated that the apparatus 200, through the operation of the processor 202, memory 204, user interface 206, communication interface 208, and/or any other components used in connection therewith, are capable of performing each of the operations described herein with respect to FIG. 3 and depicted or otherwise contemplated therein.

Many example implementations of the apparatus 200, the operations 300, and/or other embodiments of the invention are particularly advantageous in contexts where the parameters and/or other requirements of a request data object require the physical transport of materials and/or other resources from one geographic location to another within limited time constraint by systems associated with a network response asset. Some such example implementations contemplate the online ordering of food for delivery. In such example implementations, a request object system, such as a mobile device, may be used by user to create a request data object that contained an order and information about the details of that order, such as the restaurant to which it should be directed, the requested menu items and quantities, and other such information. Upon receipt of that order via a transmitted request data object, the object-asset monitoring system, or a related system in communication with the object-asset monitoring system, may pair the order with a response asset system, such as vehicle equipped with a mobile device or otherwise configured to communicate with the object-asset monitoring system, which can then be used fulfill the request (such as picking up the food from the restaurant and delivering it to a customer). In monitoring and detecting errors associated with such request data object and network response asset systems, some implementations are aimed at providing information extracted from incoming data streams to an interface in the form of selectable objects that can be used, to ascertain information about the request data objects and network asset system, recognize and remediate error conditions, and/or open communication channels in an efficient manner.

As such, and as shown at block 302, the apparatus 200 is capable of receiving a plurality of first data streams, wherein each first data stream within the plurality of first data streams is associated with a request data object. As discussed elsewhere herein, a request data object is any data object that contains a request from a user or other entity for access to and/or use of system resources and an indication of the requirements and/or other parameters associated with the request. Some example implementations of block 302 arise in contexts where the system resources include, but are not necessarily limited to, requests that a system associated with a network response agent be used to transport goods, materials, and/or other resources from one location to another, so as to effectuate a timely delivery of such goods, materials, and/or other resource to a particular locations. In some such example implementations, a request data object may be transmitted by a mobile device associated with a user, such as request object device 104B shown in FIG. 1, or the like, directly to the apparatus 200 and/or indirectly, such as through an object-asset monitoring system, such as object-asset monitoring system 102, that may be associated with the apparatus 200. Any approach to generating a request data object and any approach to receiving a datastream associated with such a request data object may be used in connection with implementations of block 302.

As shown in block 304, the apparatus 200 is also capable of receive a plurality of second data streams, wherein each second data stream within the plurality of second data streams is associated with a network response asset. As with block 302, some example implementations of block 304 arise in contexts where a request data object includes a request that a system associated with a network response agent be used to transport goods, materials, and/or other resources from one location to another, so as to effectuate a timely delivery of such goods, materials, and/or other resource to a particular locations. In some such example implementations, data associated with a network response asset may be transmitted as a stream by a mobile device associated with a user, such as response asset device 106B shown in FIG. 1, or the like, directly to the apparatus 200 and/or indirectly, such as through an object-asset monitoring system, such as object-asset monitoring system 102, that may be associated with the apparatus 200. Any system associated with a network response asset and any approach to receiving a datastream associated with such a network response asset or related system may be used in connection with implementations of block 304.

As shown at block 306, the apparatus is also capable of extracting from each first data stream a set of request parameters. Implementations of block 306 contemplate request data objects that include one or more request parameters. Such request parameters may include, but are not limited to, information describing the requirements of the request associated with the request data object, an individual or entity that initiated or is otherwise associated with the request, particularized instructions associated with the request, one or more locations associated with the request, one or more times and/or timing constraints associated with the request, and/or any other information that relates to the request data object, the request reflected therein, and/or the characteristics of the request data object.

In some particularly advantageous implementations that involve the movement of resources from one location to another, the first set of request parameters includes, for example, a first location identification, wherein the first location identification is associated with a requested intermediate destination. As used herein, the term "intermediate destination" may refer to a location associated with a request data object that is not the delivery point (i.e., the target destination) associated with the request data object. In many implementations, an intermediate destination is a location at which goods, materials, and/or other resources must be acquired in connection with fulfilling the requirements associated with a request data object. In many example implementations, the identification of such an intermediate destination takes the form of coordinates, address information, and/or other location data. However, it will be appreciated that any approach to identifying a location may be used in implementations of block 306.

In some such advantageous implementations, the first set of request parameters also includes a set of request instructions associated with the requested intermediate destination. As noted above, some implementations of block 306 involve acquiring resources from an intermediate destination and/or otherwise interacting with entities and systems associated with the intermediate destination. In such example implementations of block 306, the request instructions associated with the intermediate destination may include, for example, a list of items to acquire, information about protocols and/or other authorization processes to be used to gain access to the intermediate destination, parking information and/or other information associated with the intermediate destination and/or the request data object.

In some example implementations, the first set of request parameters also includes a second location identification, wherein the second location identification is associated with a requested target destination. As used herein, the term "target destination" may refer to a location associated with a request data object that constitutes the last location associated with the request data object, such as a delivery point. Any of the approaches that may be used to identify an intermediate destination, and any other approach to identifying a destination, may be used in implementations of block 306 to identify a target destination.

In some example implementations of block 306, the first set of request parameters further comprises a timing parameter associated with the intermediate destination and a timing parameter associated with the target destination. As noted herein, may example implementations of process 300 arise in the context of time-sensitive requests for resources. In some such implementations of block 306, the request parameters associated with a request data object may include a timing parameter associated with the intermediate destination, such as a time at which resources may be available for pickup and/or a time before which resources must be picked up to successfully fulfill the requirements of the request data object. Similarly, the timing constraint associated with a target destination may include, for example, a time by which a delivery must be made to the target destination in order to fulfill the request. In another example implementation, the timing constraint may include a limit on the amount of time that may pass between acquiring resources at the intermediate destination and arrival at the target destination.

As shown at block 308, the apparatus 200 is also capable of extracting from each second data stream a set of network response asset data. Implementations of block 308 contemplate situations where a system associated with a network response asset is a capable of providing information that may be included in a data stream regarding the location of the system associated with a network response asset. In some example implementations of block 308, the set of response asset data includes a triangulation location of the mobile device associated with the network response asset. In such example implementations, the mobile device may be equipped with a global positioning system (GPS) receiver and/or other hardware that allows the mobile device to interact with a GPS system, cellular network, and/or other system to triangulate a position of the mobile device. In such situations, the acquisition of a real-time or near real-time position of the mobile device and the communication of that position back to the apparatus and/or related monitoring system may permit the automatic detection of when a system associated with a network response asset has arrived at one or more locations associated with a request data object, and/or otherwise engaged in the tasks associated with the request data object. Any approach to acquiring a triangulation location may be used in implementations of block 308, including but not limited to the acquiring and transmission of GPS and/or cellular location data by a mobile device, such a response asset system device 106B, that may be associated with a network response asset system. Likewise, any approach to extracting such information from a datastream may be used in implementations of block 308.

As shown at block 310, the apparatus is also capable of generating a first set of renderable object data, wherein the first set of renderable object data is associated the set of request parameters. Implementations of block 310 are aimed at acquiring, processing, and reformatting information received regarding request data objects into a format that can be presented via a user interface. In some example implementations of block 310, all of the extracted request parameters are combined into a renderable object, the precise format of which will be governed by the interface on which the renderable object is to be displayed. In some example implementations, all or a portion of the extracted request parameters (i.e., the intermediate location, instructions associated therewith, target location, timing parameter information, and the like) may be incorporated with other information, such as unique identifiers, indicia of information associated with a user who originated the request contained in the request data object, and system-related data, such as times at which the request data object and/or related information was received, rules to be applied to the request data object, or any other information that can be associated with a request data object and/or its extracted parameter information.

As shown at block 312, the processor is also capable of generating a second set of renderable object data, wherein the second set of renderable object data is associated with the network response asset data. As with implementations of block 310 and process 300 generally, implementations of block 312 are aimed at acquiring, processing, and reformatting information received regarding systems associated with network response assets into a format that can be presented via a user interface. In some example implementations of block 312, all of the extracted network response asset data are combined into a renderable object, the precise format of which will be governed by the interface on which the renderable object is to be displayed. In some example implementations, all or a portion of the extracted network response asset data (i.e., the triangulation location information, and the like) may be incorporated with other information, such as unique identifiers, indicia of information associated with the network response asset system (including but not limited to information about operators associated therewith, historical performance data, contact information, scheduling information, and the like), and system-related data, such as times at which the network response asset information was received, rules to be applied to the network response asset system, or any other information that can be associated with a request data object and/or its extracted parameter information.

As shown at block 314, the apparatus 200 is also capable of generating a control signal causing the first set of renderable object data and the second set of renderable object data to be displayed on a single user interface as a set of selectable objects. Implementations of block 314 are aimed at providing information regarding request data objects and network response asset systems on a single interface, such that an operator and/or other user or viewer of such interface can readily ascertain information regarding request data object and network response asset systems simultaneously. By rendering the information on the interface as selectable objects, implementations of block 314 contemplate interaction between a user and the interface to allow for the monitoring and control over aspects of the request data objects and the network response asset systems, including but not limited to pairing and/or otherwise assigning request data objects with network response asset systems, detecting and attempting to address error conditions that may arise, and/or communicating with systems and/or operators or other users of systems that are associated with request data objects and/or network response assets.

With reference to block 316-320, the apparatus 200 may optionally be configured to perform additional steps, including but not limited to the optional operations shown in dashed lines in FIG. 3.

As shown at block 316, the apparatus is 200 may be optionally configured to detect an error condition and cause an indication associated with the error condition to be displayed on the single user interface. In some example implementations, the error condition is associated with a request data object. Some such example error conditions may include, but are not limited to, a failure to fulfill all of the requirements and/or other parameters of the request data object, such as a failure to deliver requested resources, an untimely delivery, other unacceptable delay, communication failures associated with request data object, the receipt of incomplete and/or indiscernible information associated with the request data object, and the like. In some example implementations, the error condition is associated with a network response asset or related system. Some such example error conditions may include, but are not limited to, a failure of a network response asset system to fulfill assigned requests, deviation from an assigned and/or anticipated route or timeline, failure to provide status updates, and/or other indicia that a system associated with a network response asset has encountered a problem or is likely to be unable to fulfill requests associated with an assigned request data object, or the like.

Implementations of optional block 316 also contemplate causing an indication of the error condition to be displayed on the single user interface. In some example implementations of block 316, the indication is presented as a selectable object on the interface, such as button or the like, which can be selected or otherwise engaged by a user. In some example implementations, the indication of the error condition may involve changing the color or appearance of an interface element (such as a selectable object, for example) that is associated with the request data object and/or network response asset that is experiencing the error condition.

As shown at block 318, the apparatus is optionally capable of receiving an indication of a selection of a selectable object associated with an error condition. As discussed above with response to optional block 316, some implementations of process 300 contemplate presenting a selectable object associated with an error condition on the interface and/or indicating that an existent selectable object is associated with an error condition by changing the appearance of the existent selectable object. Regardless of how a selectable object is rendered and otherwise associated with an error condition, an indication of a selection of that object may be passed by the interface to a monitoring system, such as object-asset monitoring system 102 and/or a portion of the apparatus 200, to trigger further operation. As discussed in connection with optional block 320 below, such further operation may include the opening of a communication channel. In some example implementations of block 318, the further action may be the rendering of additional information about the error condition and/or the related request data object and/or the related response network asset (or related system) on the interface, such that an operator or other user of the interface may be able to identify the cause and/or nature of the error condition and provide instructions via the interface to cause remedial actions to be undertaken.

As shown at block 320, the apparatus is optionally capable of opening a communication channel. Implementations of block 320 contemplate opening a communication channel between the interface and a system associated with the request data object and/or the network response asset that is experiencing the error condition. In some example implementations of block 320, selecting the selectable object associated with the error condition causes a chat window to be opened on the interface that allows the user of the interface to transmit messages to the system associated the error condition. In some such example implementations, this involves causing text messages to be sent to the mobile device of an operator of a network response asset system, in which queries, advice, and/or other information can be conveyed to the operator. Likewise the communication channel may allow for two-way and/or multi-participant communication such that operators and/or other users of the systems experiencing error conditions can convey text, images, voice signals, and/or other information to the user interface and otherwise engage in communication with an operator of the user interface. It will be appreciated that any of the communication protocols and technologies referenced and/or otherwise contemplated herein may be used in connection with block 320 and in effecting any communication between individuals and/or entities that may occur in implementations of block 320.

FIG. 4 depicts an example user interface 400 that may be used in accordance with example implementations of embodiments of the invention disclosed herein, including but not limited to process 300. The interface 400 may be presented on, for example, a mobile device such as a mobile phone and/or any the other mobile devices described and/or contemplated herein, or on any other display, such as a monitor or other display associated with object-asset monitoring server 102B and/or any other device capable of interfacing with object-asset monitoring system 102. Many particularly advantageous implementations of embodiments of the invention, some of which relate to the user interface 400, arise in the context of systems and network environments that are aimed at fulfilling request parameters associated with request data objects that seek to cause the movement of goods, materials, and/or other resources from one location to another. Some such implementations and situations contemplate the online ordering of food for subsequent delivery. As such, some of the examples presented herein include details that are directed to such contexts. However, it will be appreciated that such details are presented herein for the purpose of clarity and to otherwise facilitate the understanding of some of the concepts and aspects of the invention disclosed herein, and are not intended to confine the invention or any embodiments thereof to any single context or situations.

As shown in FIG. 4, the interface 400 includes a first set of selectable elements 402, which are individually shown as 402A-402C, each of which is associated with a request data object and the related request data object parameters. As shown in FIG. 4, each selectable element 402A-402C in the first set of selectable elements 402 includes a set of element information 404 and a set of selectable control elements 406. In example implementations of the interface 400 that are presented to a viewer who desires to monitor and/or address error conditions associated with request data objects, the first set of selectable menu elements 402 may present a list of request data objects and/or indicia of such request data objects that are currently being operated on by a network response asset system and/or have yet to be assigned to a network response asset. For example, in the case of a monitoring interface associated with an online system for requesting food deliveries from restaurants, each selectable element in the first set of selectable elements may be associated with an in-process and/or unassigned food delivery order.

In some example implementations of interface 400, the element information 404 may include, but is not limited to, information presented in text, graphic, and/or other visual form that provides information about the particular selectable element 402. For example, a particular piece of element information 404 may include an identification of a request data object, an name of the requestor, a listing of one or more locations associated with the request data object, and any other information about the request data object.

In some example implementations of interface 400, the set of selectable control elements 406 may include one or more "buttons" or other regions of the interface that a user may select to trigger a further action of the interface. For example, a user may press or otherwise provide an indication to the selectable control element 406 that causes a complete and/or otherwise expand set of information associated with the particular selectable element 402 to be presented on the user interface 400.

In the example implementation shown in FIG. 4, interface 400 also includes a second set of selectable elements 408, which are individually shown as elements 408A-408D that are rendered on the interface 400. In example implementations of interface 400, the second set of selectable elements 408A-408D are each associated with a network response asset systems. As shown in FIG. 4, each of the second set of selectable elements 408A-408D includes a set of element information 410 and a set of selectable control elements 412.

As with the element information 404 described herein, the element information 410 for each given element 408A-408D may include, but is not limited to information presented in text, graphic, and/or other visual form that provides information about the particular selectable element 408A-408D. For example, each element information 410 may include a name of the network response asset or related system, a description of the network response asset system, an identification of any operators associated with that system, status information (such as whether the network response asset system has been assigned to a request data object, and/or the progress that has been made in responding to that request data object, for example), indications about services that may be available from the network response asset system, an indication of the location and/or availability of the network response asset system, and any other information about the network response asset system. As with the selectable control elements 406A-C, each of selectable control elements 412A-D may include one or more "buttons" or other regions of the interface that a user may select to trigger a further action of the interface. For example, a user may press or otherwise provide an indication to the selectable control element 412 that causes a complete and/or otherwise expanded view of the information associated with the network response asset system associated with the particular selectable element 408 to be presented on the user interface 400.

As discussed elsewhere herein, some example implementations of embodiments of the invention contemplate detecting error conditions associated with a request data object and/or a network response asset system, and providing an indication of the error condition on the interface. Any of the error conditions described or otherwise contemplated herein, including but not limited error conditions associated with detecting that a network response asset system is outside of an expected location and/or expected time line may trigger the presentation of an indication of an error condition on the interface 400. Moreover, it will be appreciated that one or more error conditions, and the parameters thereof, may be specific to an individual request data object or network response asset system, as well as the precise contexts, situations, and environments in which such objects and systems operate.

Regardless of the precise nature of the error condition and/or the context in which it arises, an indication of the error condition may be rendered on the interface 400. For example, in some situations, it may be advantageous to change a color of the selectable element 404A-404C and/or 408A-408D that is associated with the error condition. For example, a selectable element may be turned to red in the case of an error. Some implementations contemplate a color coding system based on the severity of the error condition, such that yellow, for example indicates a relatively minor condition, while orange and red may be used, for example to indicate error conditions of moderate and/or greater severity.

In some situations, in may be advantageous to add a button and/or rename a button associated with the selectable control elements 406A-C and/or 412A-D, to alert a user that an error condition exists. Upon selection of such a button, the communication interface 414 may be presented on the user via the interface. In some example implementations, communication interface 414 may facilitate a chat functionality between a user of the interface and a system and/or operator of a system associated with an error condition. For example, if an error condition was detected in connection with the network response asset associated with element 408B, the selectable control element 412B may be adjusted such that, upon selection of the button at 412B, communication interface 414 is presented on the interface 400, and a communication channel is opened between the interface and a mobile device associated with the relevant network response asset system, such that the user of the interface and an operator associated with the network response asset system may exchange information.

Some example implementations of interface 400 arise in contexts where an operator may make adjustments to the interface 400 and/or the related network response assets and/or request data objects. For example, an operator may pair a request data object with an available network response asset system in order to avoid and/or remediate an error condition. In some such example implementations, the selectable control elements 406A-C and 412A-D may include buttons, which allow the user to selectively perform such pairing and/or any other operations that the operator and/or underlying system are authorized to perform. In some example implementations, selecting any of the selectable control elements may cause particularized interfaces to be superimposed on the interface 400 that allow the user to confirm their selection and/or enter or otherwise import information to be used in editing or altering an element.

In some example implementations color coding and/or temporary adjustments to the color coding of elements rendered on the interface 400 may be used to assist a user in monitoring one or more request data objects and/or network response assets. For example, when a user selects an element 402A-402C that is associated with a request data object, an one of the elements 408A-408D that is associated with a network response asset system that is paired with that request data object may be rendered in a different color to reflect the association between the request data object and the network response asset.

It will be appreciated that, although the depicted interface 400 only displays the selectable elements 402 and 408, the element information 404 and 410, the selectable control elements 406 and 412, and the communication interface 414, it is within the scope of this invention to transmit and/or display any information communicated to and from the interface 400 and any related systems, including but not limited to an object-asset monitoring system, and/or any other system that is capable of communicating with the interface 400.

As described above, FIG. 3 illustrates a flowchart of an apparatus, such as apparatus 200, a method, and a computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 204 of an apparatus employing an embodiment of the present invention and executed by the processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising a processor and a memory, the memory comprising instructions that configure the apparatus to:
   receive a plurality of first data streams, wherein each first data stream within the plurality of first data streams is associated with at least one request data object;
   receive a plurality of second data streams, wherein each second data stream within the plurality of second data streams is associated with at least one network response asset;
   extract from each first data stream a set of request parameters, wherein the set of request parameters comprises:
      a first location identification, wherein the first location identification is associated with a requested intermediate destination;
      a set of request instructions associated with the requested intermediate destination; and
      a second location identification, wherein the second location identification is associated with a requested target destination;
   extract from each second data stream a set of network response asset data;
   generate a first set of renderable object data, wherein the first set of renderable object data is associated with the set of request parameters;
   generate a second set of renderable object data, wherein the second set of renderable object data is associated with the network response asset data, wherein the first and second sets of renderable object data are generated in accordance with one or more batch schedules; and
   generate a control signal causing the first set of renderable object data and the second set of renderable object data to be displayed on a single user interface as a set of selectable objects.

2. The apparatus of claim 1, wherein the memory further comprises instructions that configure the apparatus to:
   detect an error condition associated with a first request data object of the at least one request data object associated with the plurality of first data streams; and
   cause an indication of the error condition to be displayed on the single user interface.

3. The apparatus of claim 2 wherein the set of selectable objects further comprises the indication of the error condition associated with the at least one request data object.

4. The apparatus of claim 3, wherein the memory further comprises instructions that configure the apparatus to:
   receive an indication of a selection of a selectable object of the set of selectable objects, the selectable object associated with the error condition; and
   cause a communication channel to be opened with a system associated with the at least one request data object.

5. The apparatus of claim 1, wherein the memory further comprises instructions that configure the apparatus to:
   detect an error condition associated with a first network response asset of the at least one network response asset associated with the plurality of second data streams; and cause an indication of the error condition to be displayed on the single user interface.

6. The apparatus of claim 5 wherein the set of selectable objects further comprises the indication of the error condition associated with the at least one network response asset.

7. The apparatus of claim 6, wherein the memory further comprises instructions that configure the apparatus to:
receive an indication of a selection of a selectable object of the set of selectable objects, the selectable object associated with the error condition; and
cause a communication channel to be opened with a user device associated with the at least one network response asset.

8. A computer program product comprising at least one non-transitory computer-readable storage medium having computer-executable program code instructions stored therein, the computer-executable program code instructions comprising program code instructions configured to:
receive a plurality of first data streams, wherein each first data stream within the plurality of first data streams is associated with at least one request data object;
receive a plurality of second data streams, wherein each second data stream within the plurality of second data streams is associated with at least one network response asset;
extract from each first data stream a set of request parameters, wherein the set of request parameters comprises:
a first location identification, wherein the first location identification is associated with a requested intermediate destination;
a set of request instructions associated with the requested intermediate destination; and
a second location identification, wherein the second location identification is associated with a requested target destination;
extract from each second data stream a set of network response asset data;
generate a first set of renderable object data, wherein the first set of renderable object data is associated the set of request parameters;
generate a second set of renderable object data, wherein the second set of renderable object data is associated with the network response asset data, wherein the first and second sets of renderable object data are generated in accordance with one or more batch schedules; and
generate a control signal causing the first set of renderable object data and the second set of renderable object data to be displayed on a single user interface as a set of selectable objects.

9. The computer program product of claim 8, wherein the computer-executable program code instructions further comprise program code instructions configured to:
detect an error condition associated with a first request data object of the at least one request data object; and
cause an indication of the error condition to be displayed on the single user interface.

10. The computer program product of claim 9, wherein the set of selectable objects further comprises the indication of the error condition associated with the at least one request data object.

11. The computer program product of claim 10, wherein the computer-executable program code instructions further comprise program code instructions configured to:
receive an indication of a selection of a selectable object of the set of selectable objects, the selectable object associated with the error condition; and
cause a communication channel to be opened with a system associated with the at least one request data object.

12. The computer program product of claim 8, wherein the computer-executable program code instructions further comprise program code instructions configured to:
detect an error condition associated with a first network response asset of the at least one network response asset associated with the plurality of second data streams; and
cause an indication of the error condition to be displayed on the single user interface.

13. The computer program product of claim 12 wherein the set of selectable objects further comprises the indication of the error condition associated with the at least one network response asset.

14. The computer program product of claim 12, wherein the computer-executable program code instructions further comprise program code instructions configured to:
receive an indication of a selection of a selectable object of the set of selectable objects, the selectable object associated with the error condition; and
cause a communication channel to be opened with a user device associated with the at least one network response asset.

15. A method comprising:
receiving a plurality of first data streams, wherein each first data stream within the plurality of first data streams is associated with at least one request data object;
receiving a plurality of second data streams, wherein each second data stream within the plurality of second data streams is associated with at least one network response asset;
extracting from each first data stream a set of request parameters, wherein the set of request parameters comprises:
a first location identification, wherein the first location identification is associated with a requested intermediate destination;
a set of request instructions associated with the requested intermediate destination; and
a second location identification, wherein the second location identification is associated with a requested target destination;
extracting from each second data stream a set of network response asset data;
generating a first set of renderable object data, wherein the first set of renderable object data is associated the set of request parameters;
generating a second set of renderable object data, wherein the second set of renderable object data is associated with the network response asset data, wherein the first and second sets of renderable object data are generated in accordance with one or more batch schedules; and
generating a control signal causing the first set of renderable object data and the second set of renderable object data to be displayed on a single user interface as a set of selectable objects.

16. The method of claim 15, wherein the method further comprises:
detecting an error condition associated with a first request data object of the at least one request data object associated with the plurality of first data streams; and
causing an indication of the error condition to be displayed on the single user interface.

17. The method of claim 16 wherein the set of selectable objects further comprises the indication of the error condition associated with the at least one request data object.

18. The method of claim 17, wherein the method further comprises:
   receiving an indication of a selection of a selectable object of the set of selectable objects, the selectable object associated with the error condition; and
   causing a communication channel to be opened with a system associated with the at least one request data object.

19. The method of claim 15, wherein the method further comprises:
   detecting an error condition associated with a first network response asset of the at least one network response asset associated with the plurality of second data streams; and
   causing an indication of the error condition to be displayed on the single user interface as a selectable object of the set of selectable objects.

20. The method of claim 19, wherein the method further comprises:
   receiving an indication of a selection of the selectable object associated with the error condition; and
   causing a communication channel to be opened with a user device associated with the at least one network response asset.

\* \* \* \* \*